US011383724B2

(12) United States Patent
Roman et al.

(10) Patent No.: US 11,383,724 B2
(45) Date of Patent: Jul. 12, 2022

(54) METHOD, APPARATUS AND COMPUTER PROGRAM FOR TRANSFERRING AN EXECUTION OF A FUNCTION FOR A VEHICLE BETWEEN A BACKEND ENTITY AND THE VEHICLE, METHOD, APPARATUS AND COMPUTER PROGRAM FOR A VEHICLE AND METHOD, APPARATUS AND COMPUTER PROGRAM FOR A BACKEND ENTITY

(71) Applicants: Volkswagen Aktiengesellschaft, Wolfsburg (DE); MAN Truck & Bus SE, Munich (DE)

(72) Inventors: Alieiev Roman, Stendal (DE); Schmitz Steffen, Wesel (DE); Ahmad El Assaad, Wolfsburg (DE); Guillaume Jornod, Berlin (DE)

(73) Assignees: Volkswagen Aktiengesellschaft, Wolfsburg (DE); MAN Truck & Bus SE., Munich (DE)

( * ) Notice: Subject to any disclaimer, the term of this patent is extended or adjusted under 35 U.S.C. 154(b) by 477 days.

(21) Appl. No.: 16/439,807

(22) Filed: Jun. 13, 2019

(65) Prior Publication Data
US 2019/0382028 A1     Dec. 19, 2019

(30) Foreign Application Priority Data
Jun. 15, 2018  (EP) .................................. 18177997

(51) Int. Cl.
*B60W 50/00* (2006.01)
*B60W 10/22* (2006.01)
(Continued)

(52) U.S. Cl.
CPC ........ *B60W 50/0097* (2013.01); *B60W 10/22* (2013.01); *B60W 40/02* (2013.01);
(Continued)

(58) Field of Classification Search
CPC .. B60W 50/0097; B60W 10/22; B60W 40/02; B60W 2420/42; B60W 2420/52;
(Continued)

(56) References Cited

U.S. PATENT DOCUMENTS 6,028,550 A * 2/2000 Froeberg ................ G01C 21/28
701/428
6,898,432 B1    5/2005 Jiang
(Continued)

FOREIGN PATENT DOCUMENTS

EP    3016434 A1    5/2016
EP    3322204 A1    5/2018

*Primary Examiner* — Frederick M Brushaber
(74) *Attorney, Agent, or Firm* — 2SPL Patent Attorneys PartG mbB; Charles Blackledge

(57) ABSTRACT

A method, apparatus and computer program are disclosed for transferring an execution of a function for a vehicle between a backend entity and the vehicle. Transferring an execution of a function for a vehicle between a backend entity and the vehicle comprises controlling an execution of the function for the vehicle by a backend entity. The backend entity communicates with the vehicle via a mobile communication system. The method further comprises determining an estimated driving route of the vehicle, determining information related to an area with insufficient coverage of the mobile communication system along the estimated route of the vehicle, and transferring the execution of the function from the backend entity to the vehicle based on the information related to the area with insufficient coverage of the mobile communication system along the estimated route of the vehicle.

19 Claims, 7 Drawing Sheets

(51) Int. Cl.
| | |
|---|---|
| *B60W 40/02* | (2006.01) |
| *H04W 4/40* | (2018.01) |
| *G07C 5/00* | (2006.01) |
| *G05D 1/00* | (2006.01) |
| *G07C 5/08* | (2006.01) |
| *G08G 1/16* | (2006.01) |

(52) U.S. Cl.
CPC .......... *H04W 4/40* (2018.02); *B60W 2420/42* (2013.01); *B60W 2420/52* (2013.01); *B60W 2510/18* (2013.01); *B60W 2552/00* (2020.02); *B60W 2555/20* (2020.02); *B60W 2556/10* (2020.02); *B60W 2710/22* (2013.01); *B60W 2756/10* (2020.02)

(58) Field of Classification Search
CPC ......... B60W 2510/18; B60W 2552/00; B60W 2555/20; B60W 2556/10; B60W 2710/22; B60W 2756/10; H04W 4/40; G07C 5/008; G07C 5/0825; G05D 1/0011; G08G 1/164; G08G 1/166
See application file for complete search history.

(56) References Cited

U.S. PATENT DOCUMENTS

| | | | |
|---|---|---|---|
| 9,056,556 B1 | 6/2015 | Hyde et al. | |
| 10,587,124 B2* | 3/2020 | DeVaul | H02J 50/05 |
| 2018/0017962 A1 | 1/2018 | Miller et al. | |
| 2019/0036349 A1* | 1/2019 | DeVaul | H02J 50/12 |
| 2019/0382028 A1* | 12/2019 | Roman | G05D 1/0011 |
| 2021/0061306 A1* | 3/2021 | Dagan | H04W 4/46 |

* cited by examiner

METHOD, APPARATUS AND COMPUTER PROGRAM FOR TRANSFERRING AN EXECUTION OF A FUNCTION FOR A VEHICLE BETWEEN A BACKEND ENTITY AND THE VEHICLE, METHOD, APPARATUS AND COMPUTER PROGRAM FOR A VEHICLE AND METHOD, APPARATUS AND COMPUTER PROGRAM FOR A BACKEND ENTITY

CROSS-REFERENCE TO RELATED APPLICATION

This application claims, under 35 U.S.C. § 119(b), the benefit of EP18177997 filed in the European Patent Office on Jun. 15, 2018.

TECHNICAL FIELD

The present invention relates to a method, an apparatus and a computer program for transferring an execution of a function for a vehicle between a backend entity and the vehicle, to a method, an apparatus and a computer program for a vehicle and to a method, an apparatus and a computer program for a backend entity, more specifically, but not exclusively, to transferring the execution of a function for the vehicle from the backend entity to the vehicle ahead of an upcoming area with insufficient (or no) coverage of a mobile communication system.

BACKGROUND

The improvement of vehicle functionality by processing data is a field of research and development. For example, LIDAR (Light Detection and Ranging) may be used by vehicles to detect and track other vehicles on the road. Based on such tracking functionality, a vehicle may be configured to engage emergency breaking, e.g. to avoid a collision with another vehicle or with a pedestrian. Such functionality may require large amounts of processing power to yield good results.

There may be a desire for an improved concept for the processing of vehicle data by a function, in which large amounts of processing power may be provided for the processing of vehicle data.

SUMMARY

Embodiments are based on the finding that the processing of vehicle data by a function may be offloaded to a remote computing entity, which may be located within a mobile communication system. If the computing entity is located within the mobile communication system, it may have good connectivity with the vehicle through the use of the radio access network of the mobile communication system, and may provide low-latency communication, as the computing entity may be located at or close to base stations of the mobile communication system. If the vehicle enters an area with no coverage of the mobile communication system (or with a coverage that enables a data throughput only below a minimum data throughput threshold), the function may be transferred to the vehicle, which may execute the function in the meantime (e.g. albeit at a reduced complexity or precision).

Embodiments provide a method for transferring an execution of a function for a vehicle between a backend entity and the vehicle. The method comprises controlling an execution of the function for the vehicle by a backend entity. The backend entity communicates with the vehicle via a mobile communication system. The method further comprises determining an estimated driving route of the vehicle. The method further comprises determining information related to an area with insufficient coverage of the mobile communication system along the estimated route of the vehicle. The method further comprises transferring the execution of the function from the backend entity to the vehicle based on the information related to the area with insufficient coverage of the mobile communication system along the estimated route of the vehicle.

Transferring the function to the vehicle in anticipation of an area with insufficient coverage may enable using an increased processing power while the vehicle is connected to the mobile communication system, while enabling continuous operation of the function by executing the function within the vehicle while the vehicle cannot use the processing power provided by the backend entity via the mobile communication system.

In at least some embodiments, the method further comprises transferring the function from the vehicle to the backend entity after the vehicle has left the area with insufficient coverage of the mobile communication system along the estimated route of the vehicle, e.g. along with information about the route and environment collected while following the route of the vehicle in the area with insufficient coverage. The method may further comprise controlling the execution of the function for the vehicle by the backend entity, e.g. after the function has been re-transferred to the backend entity. After transferring the execution of the function back to the backend entity, the increased processing power of the mobile communication system may be used for the execution of the function again.

In some examples, the function is a sensor data processing function for sensor data of the vehicle. For example, the sensor data may comprise of lidar sensor data, radar sensor data, camera sensor data, ABS (Automatic Braking System) sensor data (e.g. of an ABS sensor), ESP (Electronic stability control) sensor data (e.g. of an ESP sensor), light sensor data (e.g. of a light sensor), temperature sensor data (e.g. of a temperature sensor) or rain sensor data (e.g. of a rain sensor) or any other (environmental) sensor data that helps to interpret the vehicle's environment. Off-loading the processing of sensor data to the backend entity may enable a more thorough analysis of the sensor data and may enable a sensor fusion of sensor data of multiple vehicles within the mobile communication system.

Alternatively or additionally, the function may be an adaptation function for adapting a suspension of the vehicle. For example, the function may be used to adapt the suspension of the vehicle to changing road conditions, e.g. based on sensor data of the vehicle, based on sensor data of further vehicles, or based on sensor data of road-side stations located at a road the vehicle is currently driving on.

In at least some embodiments, the method may be performed by a stationary entity of the mobile communication system. For example, the backend entity may be located at a base station of the mobile communication system. This may enable a low-latency communication between the entity and the vehicle. Alternatively, the backend entity may be located in a core network of the mobile communication system or the backend entity may be a stationary entity located outside the mobile communication system. This may enable an increasingly more centralized, and thus more scalable and efficient, execution of the function. If the backend entity is located within the core network of the mobile communication system, a balance between latency and centralization of the execution of the function may be struck.

In some embodiments, the method further comprises receiving vehicle data from the vehicle (e.g. for the backend entity). The execution of the function for the vehicle by the backend entity may be based on the vehicle data. The vehicle may provide the vehicle data for processing to the backend entity.

In various embodiments, the method comprises receiving further vehicle data from one or more further vehicles. The execution of the function for the vehicle by the backend entity may be based on the further vehicle data. For example, the vehicle data may be augmented by the further vehicle data. The backend entity may combine the vehicle data and the further vehicle data in the execution of the function. In some embodiments, the backend entity may perform sensor fusion on the vehicle data and the further vehicle data for the execution of the function.

In at least some embodiments, the transferring of the function from the vehicle to the mobile communication system comprises transferring intermittent data of the function from the vehicle to the backend entity. The transmitted intermittent data may be or comprise unprocessed data used for executing the function within the vehicle. Alternatively, the transmitted intermittent data may be or comprise processed data resulting from executing the function within the vehicle. This may enable a retroactive execution of the function by the backend entity after the vehicle has left the area with insufficient coverage. The method may further comprise providing information related to the intermittent data of the function to one or more further vehicles. For example, the backend entity may transmit the intermittent data with information related to the area with insufficient coverage to the further vehicle, which may be driving on the same road in the opposite direction.

Embodiments further provide a method for a vehicle. The method comprises providing vehicle data of the vehicle to a backend entity via a mobile communication system for use in an execution of a function for the vehicle by the backend entity. The method further comprises transferring the execution of the function from the backend entity to the vehicle via the mobile communication system based on information related to an area with insufficient coverage of the mobile communication system along an estimated route of the vehicle. The method further comprises executing the function within the vehicle. The method further comprises transferring the execution of the function from the vehicle to the backend entity via the mobile communication system after the vehicle has left the area with insufficient coverage of the mobile communication system along the estimated route of the vehicle.

Transferring the function to the vehicle in anticipation of an area with insufficient coverage may enable using an increased processing power while the vehicle is connected to the mobile communication system, while enabling continuous operation of the function by executing the function within the vehicle while the vehicle cannot use the processing power provided by the backend entity via the mobile communication system.

Embodiments further provide a method for a backend entity. The method comprises receiving vehicle data of a vehicle. The method further comprises executing a function for the vehicle based on the vehicle data. The method further comprises transferring the execution of the function to the vehicle based on information related to an area with insufficient coverage along an estimated driving route of the vehicle.

Transferring the function to the vehicle in anticipation of an area with insufficient coverage may enable using an increased processing power while the vehicle is connected to the mobile communication system, while enabling continuous operation of the function by executing the function within the vehicle while the vehicle cannot use the processing power provided by the backend entity via the mobile communication system.

Embodiments further provide a computer program having a program code for performing at least one of the methods, when the computer program is executed on a computer, a processor, or a programmable hardware component.

Embodiments further provide an apparatus for transferring an execution of a function for a vehicle between a backend entity and the vehicle. The apparatus comprises at least one interface for communicating with the vehicle and with the backend entity. The apparatus further comprises a control module configured to control an execution of the function for the vehicle by the backend entity. The backend entity communicates with the vehicle via a mobile communication system. The control module is further configured to determine an estimated driving route of the vehicle. The control module is further configured to determine information related to an area with insufficient coverage of the mobile communication system along the estimated route of the vehicle. The control module is further configured to transfer the execution of the function from the backend entity to the vehicle via the mobile communication system based on the information related to the area with insufficient coverage of the mobile communication system along the estimated route of the vehicle.

Embodiments further provide an apparatus for a vehicle. The apparatus comprises an interface for communicating with a backend entity via a mobile communication system and a control module. The control module is configured to provide vehicle data of the vehicle to the backend entity via the mobile communication system for use in an execution of a function for the vehicle by the backend entity. The control module is further configured to transfer the execution of the function from the backend entity to the vehicle via the mobile communication system based on information related to an area with insufficient coverage of the mobile communication system along an estimated route of the vehicle. The control module is further configured to execute the function within the vehicle. The control module is further configured to transfer the execution of the function from the vehicle to the backend entity via the mobile communication system after the vehicle has left the area with insufficient coverage of the mobile communication system along the estimated route of the vehicle.

Embodiments further provide an apparatus for a backend entity. The apparatus comprises at least one interface for communicating via the mobile communication system. The apparatus further comprises a control module configured to receive vehicle data of a vehicle. The control module is further configured to execute a function for the vehicle based on the vehicle data. The control module is further configured to transfer the execution of the function to the vehicle based on information related to an area with insufficient coverage along an estimated driving route of the vehicle.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
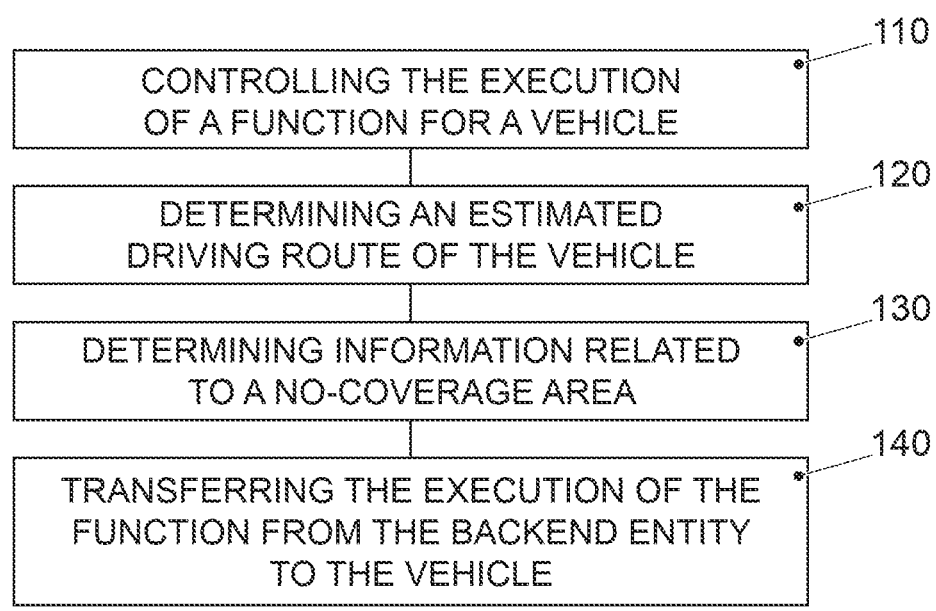
FIGS. 1a and 1b illustrate flow charts of embodiments of a method for transferring an execution of a function for a vehicle between a backend entity and the vehicle.
Figure 1B:
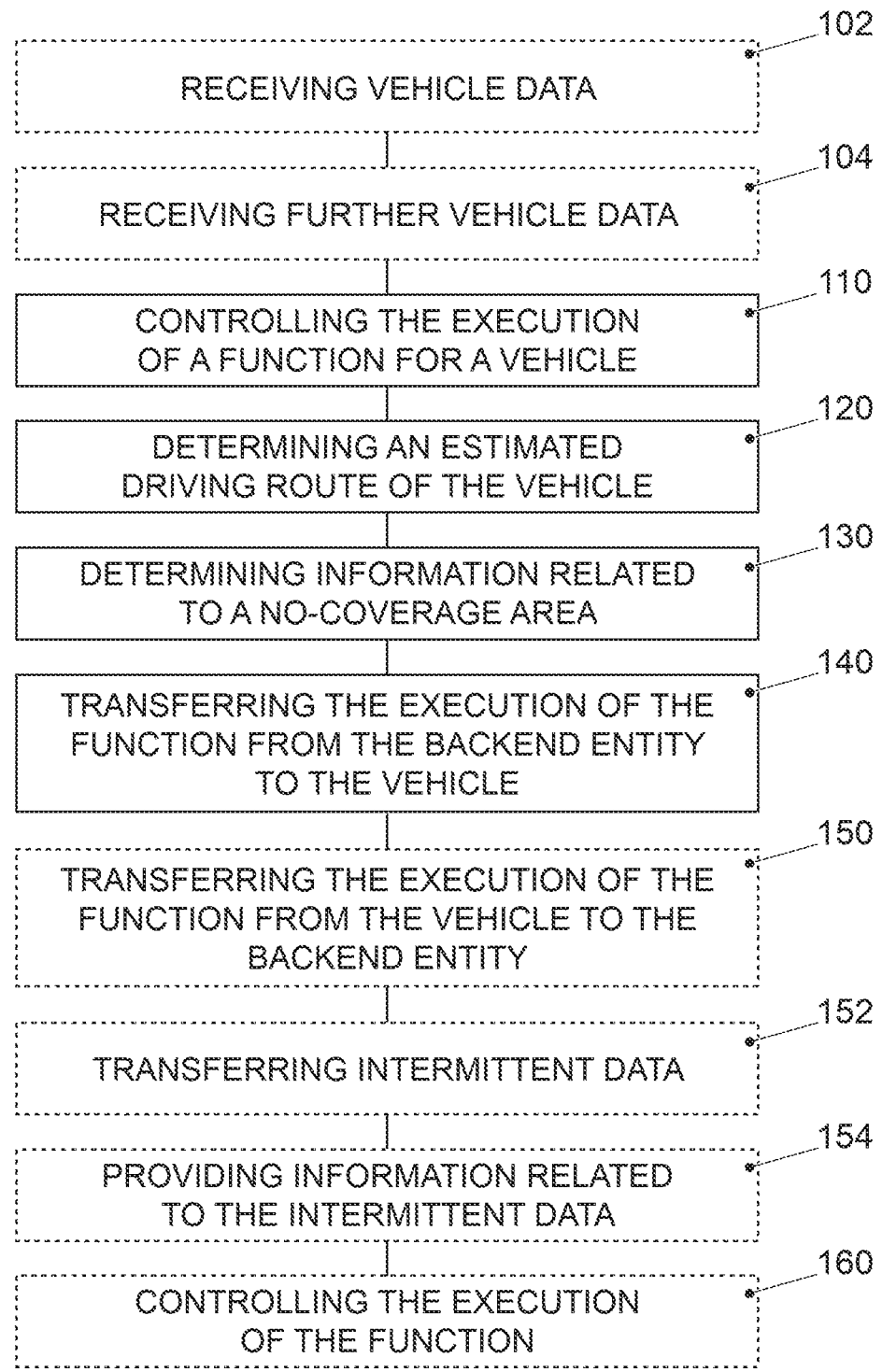

FIGS. 1a and 1b illustrates flow charts of embodiments of a method for transferring an execution of a function for a vehicle 200 between a backend entity 300 and the vehicle 200. The method comprises controlling 110 an execution of the function for the vehicle 200 by a backend entity 300. The backend entity 300 communicates with the vehicle 200 via a mobile communication system 100. The method further comprises determining 120 an estimated driving route of the vehicle 200. The method further comprises determining 130 information related to an area with insufficient coverage of the mobile communication system 100 along the estimated route of the vehicle 200. The method further comprises transferring 140 the execution of the function from the backend entity 300 to the vehicle 200 based on the information related to the area with insufficient coverage of the mobile communication system 100 along the estimated route of the vehicle.

Figure 1C:
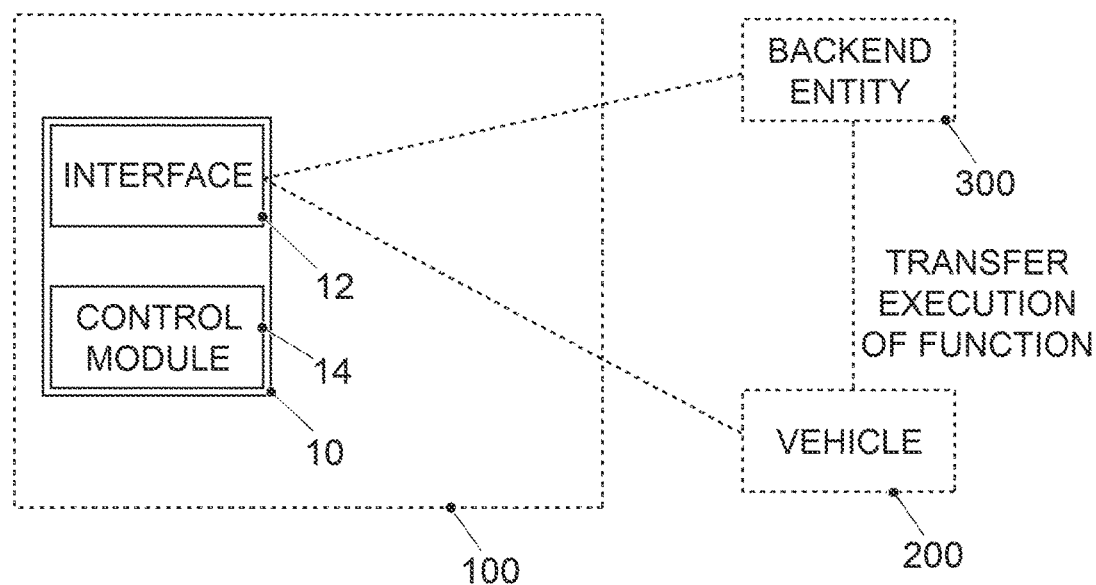
FIG. 1c illustrates a block diagram of an embodiment of an apparatus for transferring an execution of a function for a vehicle between a backend entity and the vehicle.

FIG. 1c illustrates a block diagram of an embodiment of a corresponding apparatus 10 for transferring the execution of the function for the vehicle 200 between the backend entity 300 and the vehicle 200. The apparatus 10 comprises at least one interface 12 for communicating with the vehicle and with the backend entity 300. The apparatus 10 further comprises a control module 14 configured to control the execution of the function for the vehicle 200 by the backend entity 300. The control module 14 is further configured to determine the estimated driving route of the vehicle 200. The control module 14 is further configured to determine the information related to an area with insufficient coverage of the mobile communication system 100 along the estimated route of the vehicle 200. The control module 14 is further configured to transfer the execution of the function from the backend entity 300 to the vehicle 200 via the mobile communication system 100 based on the information related to the area with insufficient coverage of the mobile communication system 100 along the estimated route of the vehicle. If not specified otherwise, the control module 14 is configured to perform further method steps of the method of FIGS. 1a and 1b as introduced above or below, e.g. via the at least one interface 12.

The following description relates to both the method of FIGS. 1a and 1b and the apparatus 10 of FIG. 1c.

The method is suitable for transferring the execution of a function for a vehicle between a backend entity 300 and the vehicle 200. For example, transferring the execution of the function may comprise controlling where the function is executed. In embodiments, both the backend entity 300 and the vehicle 200 may be configured to, or suitable for, executing the function, and by transferring the execution of the function, it may be determined, which of the backend entity or the vehicle is to execute the function, or to whether the results of the function executed by the backend entity or the results of the function executed by the vehicle are to be used. Transferring the execution of the function may further comprise transferring data used for the execution of the function from the backend entity to the vehicle (or vice versa). For example, if the execution of the function is transferred from the backend entity 300 to the vehicle 200, the backend entity 300 may be instructed to cease execution of the function and to (optionally) transfer the data used for the execution of the function to the vehicle, and the vehicle 200 may be instructed to start the execution of the function, e.g. based on the transferred data. If the execution of the function is transferred from the vehicle 200 to the backend entity 300, the vehicle 200 may be instructed to cease execution of the function and to (optionally) transfer the data used for the execution of the function (e.g. intermittent data) to the backend entity 300, and the backend entity 300 may be instructed to start the execution of the function, e.g. based on the transferred data.

In various examples, the method is performed by the mobile communication system 100, e.g. by a (stationary) entity of the mobile communication system 100. In at least some embodiments, the mobile communication system comprises a (wire-bound) core network and a radio access network. The core network of the mobile communication system 100 may comprise control entities of the mobile communication system associated with the base stations of the mobile communication system. The radio access network may comprise the base stations of the mobile communication system 100. The core network may be configured to be suitable for distributing the data transmissions and/or voice connections routed via the mobile communication system to and from the base stations of the mobile communication system 100. The method may be performed by a control entity of the mobile communication system, e.g. a control entity located within a core network of the mobile communication system 100.

In some embodiments, the backend entity 300 is located at a base station of the mobile communication system 100. For example, the backend entity 300 may be connected to the base station of the mobile communication system 100 using a (direct) cable connection, e.g. a direct fiber optic connection.

The backend entity 300 may be associated with the base station. The backend entity 300 may be associated with a single base station and located at the single base station. Alternatively, the backend entity may be located in the vicinity of a plurality of base stations (of the mobile communication system), and may be associated with the plurality of base stations. For example, the backend entity 300 may be located at a base station of the plurality of base stations, and may be connected to the other base stations of the plurality of base stations via a fiber optic connection between the plurality of base stations. The backend entity 300 may form a mobile edge cloud with the base station of with the plurality of base stations.

Alternatively, the backend entity is located in a core network of the mobile communication system 100. The backend entity 300 may be associated with the plurality of base stations from within the core network of the mobile communication system. The backend entity may be connected to the plurality of base stations via fiber optic connections from the plurality of base stations to the core network of the mobile communication system 100.

In some embodiments, the method may be performed by a stationary entity located within a network of a vehicle manufacturer or vehicle service provider of the vehicle 200. For example, the method may be performed by the backend entity 300. The backend entity 300 is a stationary entity located outside the mobile communication system 100. For example, the backend entity 300 may be located within a network of a vehicle manufacturer or of a vehicle service provider of the vehicle 200.

The backend entity 300 may correspond to a server, a group of servers, a data center, a virtual server instance, a group of virtual server instances, to a backend system of a vehicle manufacturer or to a backend system of a provider of the mobile communication system 100. For example, the vehicle 200 may be a land vehicle, a road vehicle, a car, an automobile, an off-road vehicle, a motor vehicle, motorbike, a truck or a lorry.

In general terms, the function to be transferred may be a function of the vehicle, e.g. a vehicle function, an auxiliary function or a computation function for the vehicle. In some embodiments, if the function is executed by the backend entity, the function may be executed in conjunction with the vehicle. For example, the method may further comprise receiving 102 vehicle data from the vehicle 200. The execution of the function for the vehicle 200 by the backend entity 300 is based on the vehicle data. If the method is performed by an entity of the mobile communication system, the method may further comprise forwarding the vehicle data to the backend entity. Alternatively, the vehicle data may be (directly) received from the vehicle 200 by the backend entity from the vehicle 200 via the mobile communication system 100. The backend entity may be configured to provide information related to a result of the function to the vehicle. If the function is executed by the backend entity, the information related to the result of the function may be interpreted by the vehicle instead of the (direct) execution of the function by the vehicle. If the function is executed by the backend entity, a part of the function may be executed by the vehicle, e.g. a stub of the function. The vehicle may be configured to provide an interface for receiving the information related to the result of the function. The method may further comprise forwarding the information related to the result of the function from the backend entity to the vehicle.

For example, the function may comprise a first precision setting and a second precision setting. The first precision setting may be used if the function is executed by the backend entity, and the second precision setting may be used if the function is executed by the vehicle. For example, the first precision setting may comprise a higher precision than the second precision setting.

In at least some embodiments, the function may be executed by the backend entity during a first period and the function may be executed by the vehicle during a second period. The execution of the function may be transferred from the backend entity to the vehicle between the first period and the second period (e.g. during a transitional period). In at least some embodiments, the execution of the function may be transferred from the backend entity to the vehicle such that a seamless transfer of the execution of the function from the backend entity to the vehicle is provided. For example, during the transitional period, the function may be executed by both the backend entity and the vehicle.

In at least some embodiments, the function is a sensor data processing function for sensor data of the vehicle. The sensor data may be the vehicle data. For example, the backend entity may execute the sensor data processing function for the sensor data of the vehicle for the vehicle 200. The backend entity may perform sensor data analysis for the vehicle. For example, the function may comprise detecting one or more objects, e.g. further vehicles, road structures and/or pedestrians within the sensor data. The sensor data may comprise at least one of lidar sensor data, radar sensor data, camera sensor data, automatic braking system sensor data, electronic stability control sensor data, light sensor data, temperature sensor data, rain sensor data, and environmental sensor data. The environmental sensor data may be suitable for interpreting an environment of the vehicle. For example, the information related to the result of the function may comprise information related to one or more objects detected within the sensor data. Alternatively, the information related to the result of the function may comprise information related to one or more driving instructions (e.g. steering instructions, velocity instructions or breaking instructions) derived from the sensor data, e.g. from the one or more detected objects.

Alternatively or additionally, the function may be an adaptation function for adapting a suspension of the vehicle 200. For example, the adaptation function may be based on the sensor data of the vehicle. The adaptation function may be based on a sensor data processing function for sensor data of the vehicle. Additionally, the adaptation function may be based on further vehicle data of further vehicles, e.g. of further vehicles that have travelled on the same driving route as the vehicle in the past. In some embodiments, the vehicle data may comprise the sensor data and/or position data of the vehicle 200. The information related to the result of the function may comprise information related to one or more suspension settings for the vehicle, e.g. based on the sensor data of the vehicle and/or the vehicle data. In at least some embodiments, the adaptation function may perform sensor fusion of the sensor data of the vehicle and further vehicle data of further vehicles.

In at least some embodiments, the controlling 110 of the execution of the function may comprise keeping track, as to whether the function is executed by the backend entity. For example, the controlling 110 of the execution of the function may comprise determining, whether the function has to be transferred to the vehicle 200 based on a load of the backend entity. Alternatively or additionally, the controlling 110 of the execution of the function may comprise coordinating the execution of the function between the vehicle 200 and the backend entity 300. For example, the controlling 110 of the execution of the function may comprise forwarding the vehicle data from the vehicle 200 to the backend entity 300 and forwarding the information related to the result of the function from the backend entity 300 to the vehicle 200.

In various embodiments, the backend entity 300 communicates with the vehicle 200 via the mobile communication system 100. For example, the backend entity 300 may be configured to communicate with base stations of the mobile communication system 100 (e.g. via a wire-bound connection), and the base stations of the mobile communication system 100 may be configured to wirelessly communicate with the vehicle 200. The backend entity 300 may be configured to receive the vehicle data and/or the intermittent data from the vehicle 200 via the mobile communication system 100 and/or to transmit the information related to the result of the function to the vehicle 200 via the mobile communication system 100.

In at least some embodiments, the determining 120 of the estimated driving route of the vehicle 200 may comprise extrapolating the estimated driving route of the vehicle 200 from a current trajectory of the vehicle. For example, if the vehicle is driving on a long road or on a highway, it may be assumed that the vehicle will continue to drive on the long road or highway. Additionally, previous trips of the vehicle 200 may be taken into account. For example, if the vehicle has repeatedly traversed a sequence of roads in the past, the estimated driving route may be determined 120 based on the previous trips of the vehicle, e.g. based on the repeatedly traverse sequence of roads.

In various embodiments, the estimated driving route of the vehicle 200 may be determined 120 by the mobile communication system 100, e.g. by the stationary entity of the mobile communication system 100. The estimated driving route of the vehicle 200 may be determined by the mobile communication system 100, e.g. based on a triangulation of the position of the vehicle 200 based on wireless signals of the mobile communication system 100.

Alternatively, the estimated driving route of the vehicle 200 may be determined 120 based on information related to a planned route of the vehicle 200 or information related to a destination of the vehicle 200 received from the vehicle 200. For example, if the vehicle 200 uses satellite navigation to reach a destination, the vehicle may provide information related to the planned route or information related to the destination to the mobile communication system.

In at least some embodiments, the determining 130 of the information related to the area with insufficient coverage of the mobile communication system 100 may be based on a database or data structure of areas having an insufficient coverage of the mobile communication system. For example, the determining 130 of the information related to the area with insufficient coverage of the mobile communication system 100 may comprise determining, whether the vehicle is going to traverse an area with insufficient coverage along the estimated route of the vehicle. For example, the determining 130 of the information related to the area with insufficient coverage of the mobile communication system 100 may comprise querying the database or data structure based on the estimated route of the vehicle, e.g. based on one or more estimated positions of the vehicle 200 along the estimated route of the vehicle. In some examples, the database or data structure of areas having an insufficient coverage of the mobile communication systems may comprise information related to areas with insufficient coverage for a plurality of roads. The plurality of roads may comprise the estimated route of the vehicle 200.

In various embodiments, an area with insufficient coverage (or an area having insufficient coverage) may be an area, in which a data transmission capacity (e.g. transmission speed) of the mobile communication system 100 is below a data transmission capacity threshold, e.g. an area in which a transmission of the vehicle data and/or of the information related to the result of the function is not reliably possible due to constraints or probable constraints in the data transmission capacity. Additionally or alternatively, an area with insufficient coverage may be an area, in which a data transmission latency of the mobile communication system 100 is above a data transmission latency threshold, e.g. in which a transmission of the vehicle data and/or of the information related to the result of the function is not reliably possible due to an average or maximal latency of the mobile communication system within the area. An area with insufficient coverage may be an area, in which an a transmission protocol of the mobile communication system 100 is not comprised within a group of supported transmission protocols, e.g. in which a transmission of the vehicle data and/or of the information related to the result of the function is not reliably possible due to the available transmission protocol not supporting fast enough transmissions. For example, the group of supported transmission protocols may comprise 5G- and LTE (Long Term Evolution)-based transmission protocols. For example, the area with insufficient coverage may be a no-coverage area, or an insufficient or no-coverage area. In at least some embodiments, "coverage" of the mobile communication system in an area refers to an ability of the mobile communication system within the area to provide data communication between the vehicle and the backend (e.g. data communication having a pre-determined quality of service).

In at least some embodiments, the information related to the area with insufficient coverage of the mobile communication system 100 along the estimated route of the vehicle 200 may indicate that, or whether, an area with insufficient coverage is coming up or is located along the estimated route of the vehicle. For example, the information related to the area with insufficient coverage of the mobile communication system 100 along the estimated route of the vehicle 200 may comprise information related to a lateral distance and/or information related to an estimated time distance between the vehicle 200 and the area with insufficient coverage.

In various examples, the execution of the function may be transferred 140 from the backend entity 300 to the vehicle 200 if the information related to the information related to the area with insufficient coverage of the mobile communication system 100 along the estimated route of the vehicle indicates that an area with insufficient coverage is coming up on the estimated route of the vehicle, e.g. if the information related to the area with insufficient coverage indicates, that a (lateral or time) distance between the vehicle 200 and the area with insufficient coverage is smaller than a distance threshold. The execution of the function may be transferred 140 from the backend entity 300 to the vehicle 200 early enough, so that a seamless transition of the execution of the function is enabled. For example, once the transfer 140 of the execution of the function is initiated, the vehicle may take over the execution of the function, but might take into account the information related to the result received before the vehicle 200 enters the area with insufficient coverage.

In some embodiments, as shown in FIG. 1b, the method further comprises transferring 150 the execution of the function from the vehicle 200 to the backend entity 300 after the vehicle 200 has left the area with insufficient coverage of the mobile communication system 100 along the estimated route of the vehicle. For example, the method may further comprise determining that the vehicle has left the area with insufficient coverage. In some embodiments, the determining that the vehicle has left the area with insufficient coverage may be based on determining a quality of a connection of the vehicle 200 to the mobile communication system 100. Alternatively, the determining that the vehicle has left the area with insufficient coverage may be based on a position of the vehicle 200. In some embodiments, the determining that the vehicle has left the area with insufficient coverage may be based on receiving an indicator from the vehicle 200 that the vehicle 200 has left the area with insufficient coverage. For example, the indicator may be a successful transmission of the vehicle data by the vehicle 200. For example, once the backend entity 300 has successfully received (e.g. with an acceptable latency) the vehicle data from the vehicle 200, the execution of the function may be transferred 150 (back) to the backend entity 300. Once it is determined, that the vehicle has left the area with insufficient coverage, the execution of the function may be transferred 150 (back) from the vehicle 200 to the backend entity 300. The method may further comprise controlling 160 the execution of the function for the vehicle 200 by the backend entity 300. The controlling 160 of the execution of the function for the vehicle 200 by the backend entity 300 may be implemented similar to the controlling 110 of the execution of the function.

In various embodiments, the transferring 150 of the execution of the function from the vehicle 200 to the backend entity 300 may comprise transferring 152 intermittent data of the function from the vehicle 200 to the backend entity 300 via the mobile communication system 100. For example, the intermittent data may be based on the vehicle data accumulated while the vehicle traversed the area with insufficient coverage. In some embodiments, the transmitted 152 intermittent data is or comprises unprocessed (vehicle) data used for executing the function within the vehicle, e.g. the accumulated vehicle data. Alternatively, the transmitted 152 intermittent data may be or comprise processed data resulting from executing the function within the vehicle (e.g. similar to the information related to the result transmitted by the backend entity 300).

In at least some embodiments, the method may be based on using sensor fusion for sensor data received by the vehicle 200 and further vehicles. For example, as further shown in FIG. 1b, the method may further comprise receiving 104 further vehicle data from one or more further vehicles. For example, the further vehicle data may be similar to the vehicle data of the vehicle 200. The further vehicle data may be received 104 and stored (e.g. processed and stored) within a data structure of the backend entity 300. For example, the further vehicle data may be received 140 by the backend entity 104, or received 104 by the stationary entity of the mobile communication system 100 and forwarded to the backend entity 300. The execution of the function for the vehicle 200 by the backend entity 300 may be based on the further vehicle data. For example, the execution of the function for the vehicle 200 by the backend entity 300 may be based on the vehicle data of the vehicle 200 and on the further vehicle data. The backend entity 300 may perform sensor fusion on the vehicle data and on the further vehicle data.

The backend entity 300 may further be configured to execute one or more further functions for the one or more further vehicles. The execution of the one or more further functions may be based on the vehicle data of the vehicle 200 (e.g. on the intermittent data). For example, the method may further comprise providing information related to the vehicle data to the one or more further vehicles, e.g. as information related to one or more results of the one or more functions for the one or more further vehicles. The method may further comprise providing 154 information related to the intermittent data of the function to the one or more further vehicles.

In general, the mobile communication system 100 may, for example, correspond to one of the Third Generation Partnership Project (3GPP)-standardized mobile communication networks, where the term mobile communication system is used synonymously to mobile communication network. The mobile communication system may be a cellular mobile communication system. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station or base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a vehicle, a mobile relay transceiver for D2D communication, etc. A mobile transceiver may also be referred to as User Equipment (UE) or mobile in line with the 3GPP terminology.

A base station transceiver can be located in the fixed or stationary part of the mobile communication system. A base station transceiver may correspond to a remote radio head, a transmission point, an access point, radio equipment, a macro cell, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, a relay transceiver etc., which may be further subdivided in a remote unit and a central unit.

A mobile transceiver, e.g. the vehicle 200, can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

The at least one interface 12 may correspond to one or more inputs and/or outputs for receiving and/or transmitting information, which may be in digital (bit) values according to a specified code, within a module, between modules or between modules of different entities. The at least one interface 12 may be configured to communicate via the mobile communication system 100, e.g. with the vehicle 200 and/or the backend entity 300. In some embodiments, the at least one interface 12 may be suitable to be connected to the mobile communication system 100 using a wire-bound connection.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc. The control module 14 is coupled to the at least one interface 12.

More details and aspects of the apparatus 10 and the method are mentioned in connection with the proposed concept or one or more examples described above or below (e.g. FIGS. 2a-4). The apparatus 10 and/or the method may comprise one or more additional optional features corresponding to one or more aspects of the proposed concept or one or more examples described above or below.

Figure 2A:
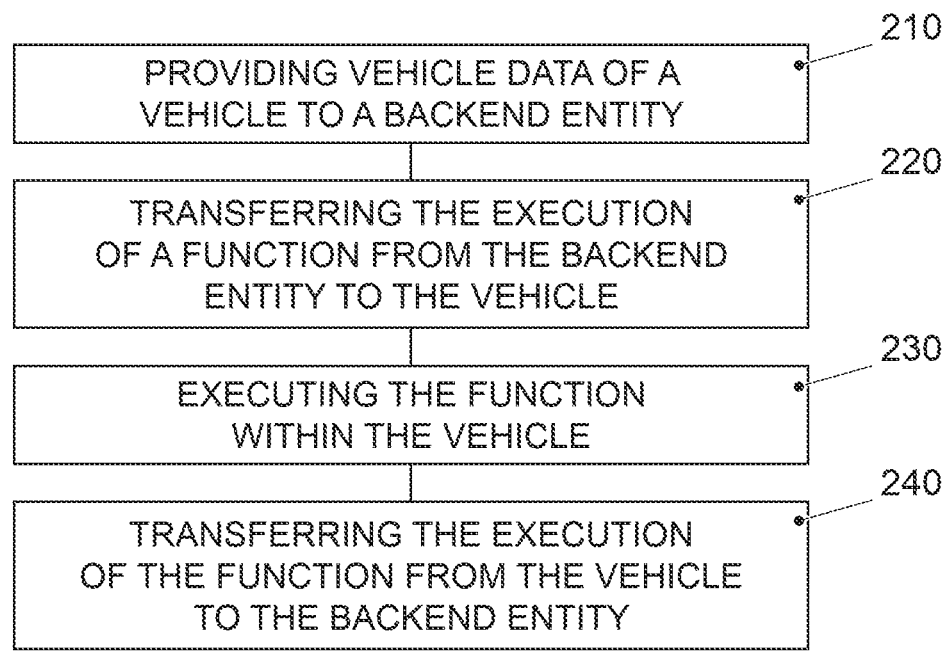
FIG. 2a illustrate a flow chart of an embodiment of a method for a vehicle.

FIG. 2a illustrates a flow chart of an embodiment of a method for a vehicle 200. The method comprises providing 210 vehicle data of the vehicle 200 to a backend entity 300 via a mobile communication system 100 for use in an execution of a function for the vehicle by the backend entity 300. The method further comprises transferring 220 the execution of the function from the backend entity 300 to the vehicle 200 via the mobile communication system 100 based on information related to an area with insufficient coverage of the mobile communication system 100 along an estimated route of the vehicle 200. The method further comprises executing 230 the function within the vehicle 200. The method further comprises transferring 240 the execution of the function from the vehicle 200 to the backend entity 300 via the mobile communication system 100 after the vehicle 200 has left the area with insufficient coverage of the mobile communication system 100 along the estimated route of the vehicle.

Figure 2B:
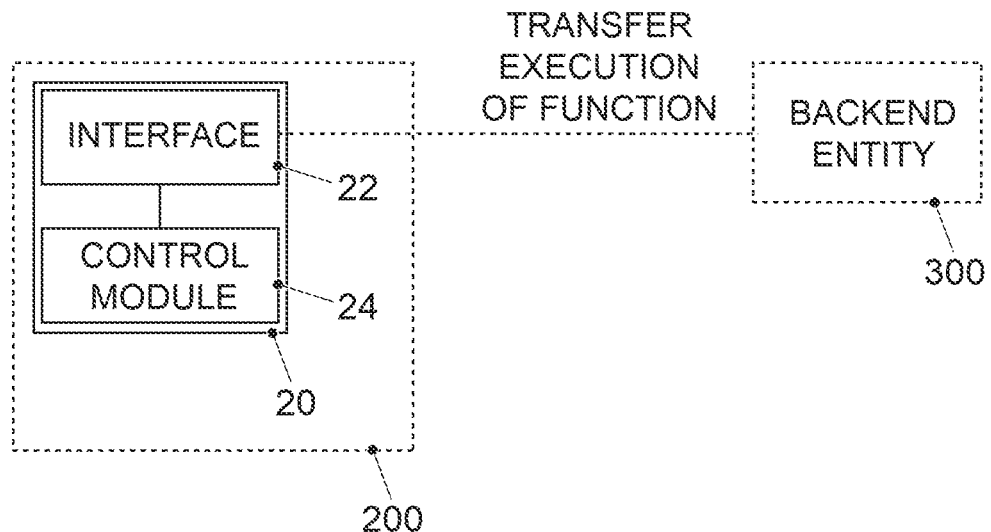
FIG. 2b illustrates a block diagram of an embodiment of an apparatus for a vehicle.

FIG. 2b illustrates a block diagram of an embodiment of a corresponding apparatus 20 for the vehicle 200. The apparatus 20 comprises an interface 22 for communicating with the backend entity 300 via the mobile communication system 100. The apparatus 20 further comprises a control module 24 configured to provide the vehicle data of the vehicle 200 to the backend entity 300 via the mobile communication system 100 for use in an execution of the function for the vehicle by the backend entity 300. The control module 24 is further configured to transfer the execution of the function from the backend entity 300 to the vehicle 200 via the mobile communication system 100 based on the information related to an area with insufficient coverage of the mobile communication system 100 along the estimated route of the vehicle 200. The control module 24 is further configured to execute the function within the vehicle 200. The control module 24 is further configured to transfer the execution of the function from the vehicle 200 to the backend entity 300 via the mobile communication system after the vehicle 200 has left the area with insufficient coverage of the mobile communication system 100 along the estimated route of the vehicle 200. If not specified otherwise, the control module 24 is configured to execute the method steps of the method of FIG. 2a, e.g. via the interface 22. FIG. 2b further shows the vehicle 200 comprising the apparatus 20.

The following description relates to both the method and the apparatus 20.

For example, the vehicle data may be sensor data of the vehicle, e.g. LIDAR sensor data, RADAR sensor data, camera sensor data, automatic braking system sensor data, electronic stability control sensor data, light sensor data, temperature sensor data, rain sensor data, or environmental sensor data. The vehicle 200 may comprise one or more elements of the group of a LIDAR sensor, a RADAR sensor, a camera, an ABS sensor, an ESP sensor, a light sensor, a temperature sensor, a rain sensor and an environmental sensor suitable for interpreting an environment of the vehicle. For example, the vehicle data may comprise position data of the vehicle, e.g. information related to (Global Positioning System or geographical) coordinates of the vehicle. For example, the function may further comprise determining the vehicle data based on the LIDAR sensor, based on the RADAR sensor, based on the camera, based on a positioning module, based on an ABS sensor, based on an ESP sensor, based on a light sensor, based on a temperature sensor, based on a rain sensor and based on an environmental sensor.

In at least some embodiments, the vehicle data is used by the backend entity 300 in the execution of the function. For example, the vehicle data may be vehicle data to be processed by the function. The function may be executed based on the vehicle data. The function may process the vehicle data to determine the information related to the result of the function.

In various examples, the function further comprises the information related to the result of the function from the backend entity (e.g. via the mobile communication system 100). The control module 24 may be configured to control the vehicle based on the received information related to the result received from the backend entity 300.

Once the execution of the function is transferred from the backend entity 300 to the vehicle 200, the execution 230 of the function may determine the result of the function within the vehicle, e.g. to determine the information related to the result of the vehicle. For example, the information related to the result of the function may comprise the result of the function or a digitalized version of the result of the function. The information related to the result of the function may comprise one or more instructions derived from the execution of the function.

In some embodiments, the execution of the function may be transferred 220 from the backend entity 300 to the vehicle 200 by starting the execution of the function within the vehicle and using the result of the function and/or the information related to the result of the function to control the vehicle 200. The transferring 220 of the execution of the function from the backend entity 300 to the vehicle 200 may comprise ceasing the transmission of the vehicle data. For example, the transferring 220 of the function may comprise transferring data to be used for the function from the backend entity 300 to the vehicle. For example, the data to be used for the function may comprise information related to the coverage area, e.g. suspension setting defaults to be used within the area with insufficient coverage. The function may comprise controlling the vehicle 200 based on the function and/or the data to be used for the function.

In some embodiments, the execution of the function may be transferred 220 from the backend entity 300 to the vehicle 200 by ceasing the execution of the function within the vehicle and using the information related to the result of the function received from the backend entity 300 to control the vehicle 200. The transferring 220 of the execution of the function from the backend entity 300 to the vehicle 200 may comprise (re-) starting the transmission of the vehicle data. For example, the execution of the function by the backend entity 300 may be triggered by the transmission of the vehicle data. For example, the transferring 220 of the function may comprise transferring data to be used for the function from the vehicle 200 to the backend entity 300, e.g. the intermittent data.

The transfer 220 of the execution of the function may be triggered by the information related to the area with insufficient coverage along an estimated driving route of the vehicle, e.g. by receiving the information related to the area with insufficient coverage along an estimated driving route of the vehicle via the mobile communication system 100, e.g. by the stationary entity of the mobile communication system 100. For example, the method may further comprise receiving the information related to the area with insufficient coverage along an estimated driving route of the vehicle. The stationary entity may transmit the information related to the area with insufficient coverage along an estimated driving route of the vehicle. For example, the information related to the area with insufficient coverage along an estimated driving route of the vehicle may comprise information related to an extent of the area with insufficient coverage. Alternatively or additionally, the information related to the area with insufficient coverage along an estimated driving route of the vehicle may comprise information related to a (lateral or time) distance between the vehicle 200 and the area with insufficient coverage. The execution of the function may be transferred 220 to the vehicle 200 based on the (lateral or time) distance between the vehicle 200 and the area with insufficient coverage.

In at least some embodiments, the function may further comprise determining, that the vehicle 200 has left the area with insufficient coverage. In some embodiments, the determining that the vehicle has left the area with insufficient coverage may be based on determining a quality of a connection of the vehicle 200 to the mobile communication system 100. Alternatively, the determining, that the vehicle has left the area with insufficient coverage may comprise comparing the position of the vehicle 220 with an extent of the area with insufficient coverage. The function may further comprise transmitting an indicator, that the vehicle has left the area with insufficient coverage to the mobile communication system 100. In some embodiments, the re-started transmission of the vehicle data to the backend entity 300 may be the indicator.

The interface 22 may correspond to one or more inputs and/or outputs for receiving and/or transmitting information, which may be in digital (bit) values according to a specified code, within a module, between modules or between modules of different entities. The 22 may be configured to communicate via the mobile communication system 100, e.g. with the stationary entity of the mobile communication system 100 and/or the backend entity 300. In some embodiments, the interface 22 may be suitable to be connected to the mobile communication system 100 using a wireless connection.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general-purpose processor, a Digital Signal Processor (DSP), a micro-controller, etc. The control module 24 is coupled to the interface 22.

More details and aspects of the method and apparatus 20 are mentioned in connection with the proposed concept or one or more examples described above or below (e.g. FIGS. 1a to 1c and 3a to 5). The method and apparatus 20 may comprise one or more additional optional features corresponding to one or more aspects of the proposed concept or one or more examples described above or below.

Figure 3A:
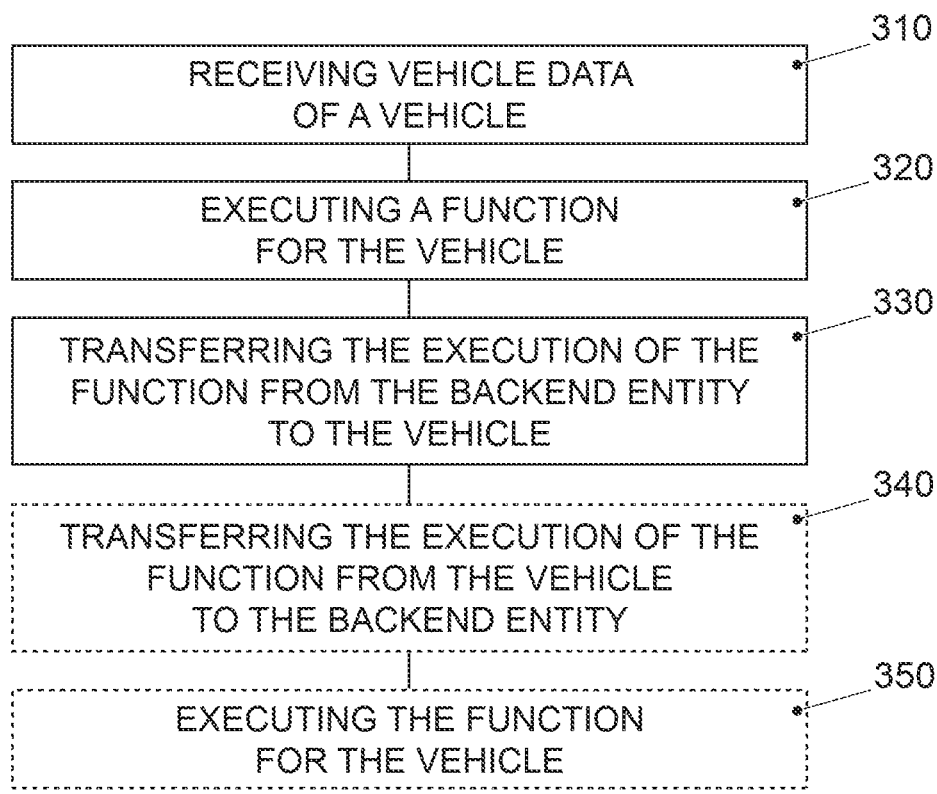
FIG. 3a illustrate a flow chart of an embodiment of a method for a backend entity.

FIG. 3a illustrates a flow chart of an embodiment of a method for a backend entity 300. The method comprises receiving 310 vehicle data of a vehicle 200. The method further comprises executing 320 a function for the vehicle based on the vehicle data. The method further comprises transferring 330 the execution of the function to the vehicle 200 based on information related to an area with insufficient coverage along an estimated driving route of the vehicle 200.

Figure 3B:
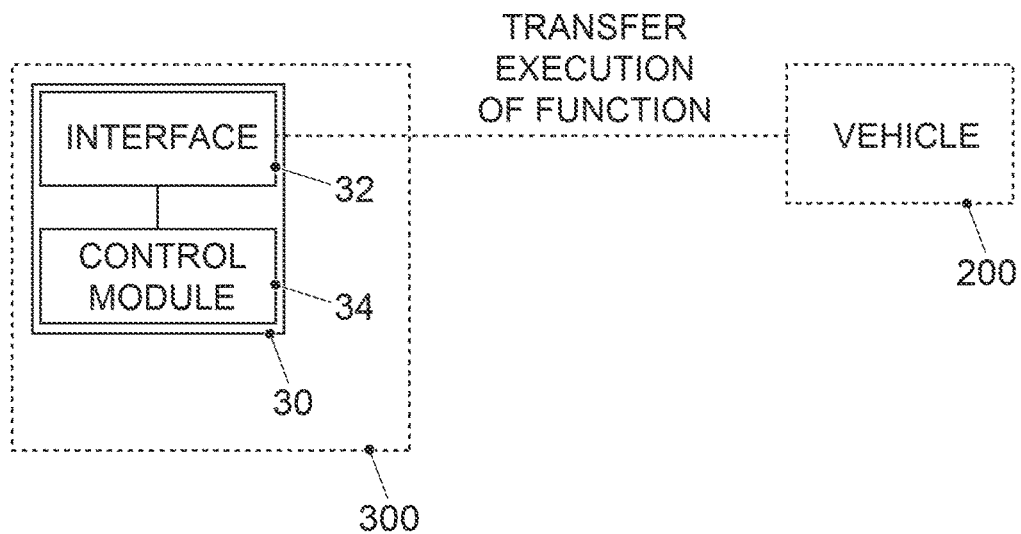
FIG. 3b illustrates a block diagram of an embodiment of an apparatus for a backend entity.

FIG. 3b illustrates a block diagram of an embodiment of a corresponding apparatus 30 for the backend entity 300. The apparatus 30 comprises at least one interface 32 for communicating via the mobile communication system 100. The apparatus 30 further comprises a control module 34 configured to receive the vehicle data of the vehicle 200. The control module 34 is further configured to execute the function for the vehicle 200 based on the vehicle data. The control module 34 is further configured to transfer the execution of the function to the vehicle 200 based on the information related to an area with insufficient coverage along an estimated driving route of the vehicle 200. If not indicated otherwise, the control module 34 is configured to execute the method steps of the method of FIG. 3a, e.g. via the at least one interface 32.

The following description relates to both the method of FIG. 3a and the apparatus 30 of FIG. 3b.

In at least some embodiments, the vehicle data is received 310 from the vehicle via the mobile communication system 100, e.g. via the stationary entity of the mobile communication system 100. The vehicle data may be forwarded from the vehicle 200 to the backend entity 300 by the stationary entity.

In various embodiment, the function may be executed to determine the information related to the result of the function. The information related to the result of the function may comprise the result of the function, and/or one or more instructions (e.g. driving instructions) derived from the result of the function. In some embodiments, the one or more instructions are the result of the function. The method may further comprise providing the information related to the result to the vehicle 200 via the mobile communication system 100, e.g. via the stationary entity of the mobile communication system 100. In some embodiments, the function for the vehicle may be executed based on the vehicle data and based on further vehicle data of one or more further vehicles. The method may further comprise receiving the further vehicle data.

In at least some embodiments, the execution of the function may be transferred 330 to the vehicle by transferring data to be used for the function to the vehicle 200 and by ceasing the execution of the function. The transfer 330 of the execution of the function may be triggered by the information related to the area with insufficient coverage along an estimated driving route of the vehicle, e.g. by receiving the information related to the area with insufficient coverage along an estimated driving route of the vehicle. For example, the method may further comprise receiving the information related to the area with insufficient coverage along an estimated driving route of the vehicle. The stationary entity may transmit the information related to the area with insufficient coverage along an estimated driving route of the vehicle. For example, the information related to the area with insufficient coverage along an estimated driving route of the vehicle may comprise information related to an extent of the area with insufficient coverage. Alternatively or additionally, the information related to the area with insufficient coverage along an estimated driving route of the vehicle may comprise information related to a (lateral or time) distance between the vehicle 200 and the area with insufficient coverage. The execution of the function may be transferred 330 to the vehicle 200 based on the (lateral or time) distance between the vehicle 200 and the area with insufficient coverage.

In at least some embodiments, the method may further comprise transferring 340 the execution of the function from the vehicle 200 to the backend entity 300 after the vehicle 200 has left the area with insufficient coverage. For example, the method may further comprise determining that the vehicle has left the area with insufficient coverage. In some embodiments, the determining that the vehicle has left the area with insufficient coverage may be based on receiving an indicator from the vehicle 200 or from the stationary entity that the vehicle 200 has left the area with insufficient coverage. For example, the indicator may be a successful transmission of the vehicle data by the vehicle 200 to the backend entity 300. For example, once the backend entity 300 has successfully received (e.g. with an acceptable latency) the vehicle data from the vehicle 200, the execution of the function may be transferred 340 (back) to the backend entity 300. Once it is determined, that the vehicle has left the area with insufficient coverage, the execution of the function may be transferred 340 (back) from the vehicle 200 to the backend entity 300.

In various embodiments, the transferring 340 of the execution of the function from the vehicle 200 to the backend entity 300 may comprise receiving intermittent data of the function from the vehicle 200 via the mobile communication system 100.

The method may further comprise executing 350 the function for the vehicle based on the vehicle data, based on the intermittent data and/or based on the further vehicle data. The executing 350 of the function for the vehicle 200 by the backend entity 300 may be implemented similar to the executing 320 of the function.

The at least one interface 32 may correspond to one or more inputs and/or outputs for receiving and/or transmitting information, which may be in digital (bit) values according to a specified code, within a module, between modules or between modules of different entities. The at least one interface 32 may be configured to communicate via the mobile communication system 100, e.g. with the vehicle 200 and/or the apparatus 20 (e.g. the stationary entity of the mobile communication system 100). In some embodiments, the at least one interface 32 may be suitable to be connected to the mobile communication system 100 using a wirebound connection.

In embodiments the control module 34 may be implemented using one or more processing units, one or more processing devices, any means for processing, such as a processor, a computer or a programmable hardware component being operable with accordingly adapted software. In other words, the described function of the control module 34 may as well be implemented in software, which is then executed on one or more programmable hardware components. Such hardware components may comprise a general-purpose processor, a Digital Signal Processor (DSP), a micro-controller, etc. The control module 34 is coupled to the at least one interface 32.

Embodiments further provide a system comprising the apparatus 10 (e.g. the stationary entity comprising the apparatus 10), the apparatus 20 (e.g. the vehicle 200 comprising the apparatus 20) and the apparatus 30 (e.g. the backend entity comprising the apparatus 30).

More details and aspects of the method and apparatus 30 are mentioned in connection with the proposed concept or one or more examples described above or below (e.g. FIGS. 1a to 2b and 4 to 5). The method and apparatus 30 may comprise one or more additional optional features corresponding to one or more aspects of the proposed concept or one or more examples described above or below.

In the future, an increasing amount of vehicle functions may be realized through mobile communication. Depending on the complexity of the functions, partial functions, e.g. complex calculations or information related to local conditions may be executed via a mobile communication system in a so-called back end. If a vehicle that supports such a function that is enabled by mobile communication moves within an area with insufficient coverage of the mobile communication system, this function might not work anymore. To enable a continuity of the function, it may be necessary to transfer the off-loaded partial function for the duration of the presence of the vehicle within the area with insufficient coverage from the backend to the vehicle.

Figure 4:
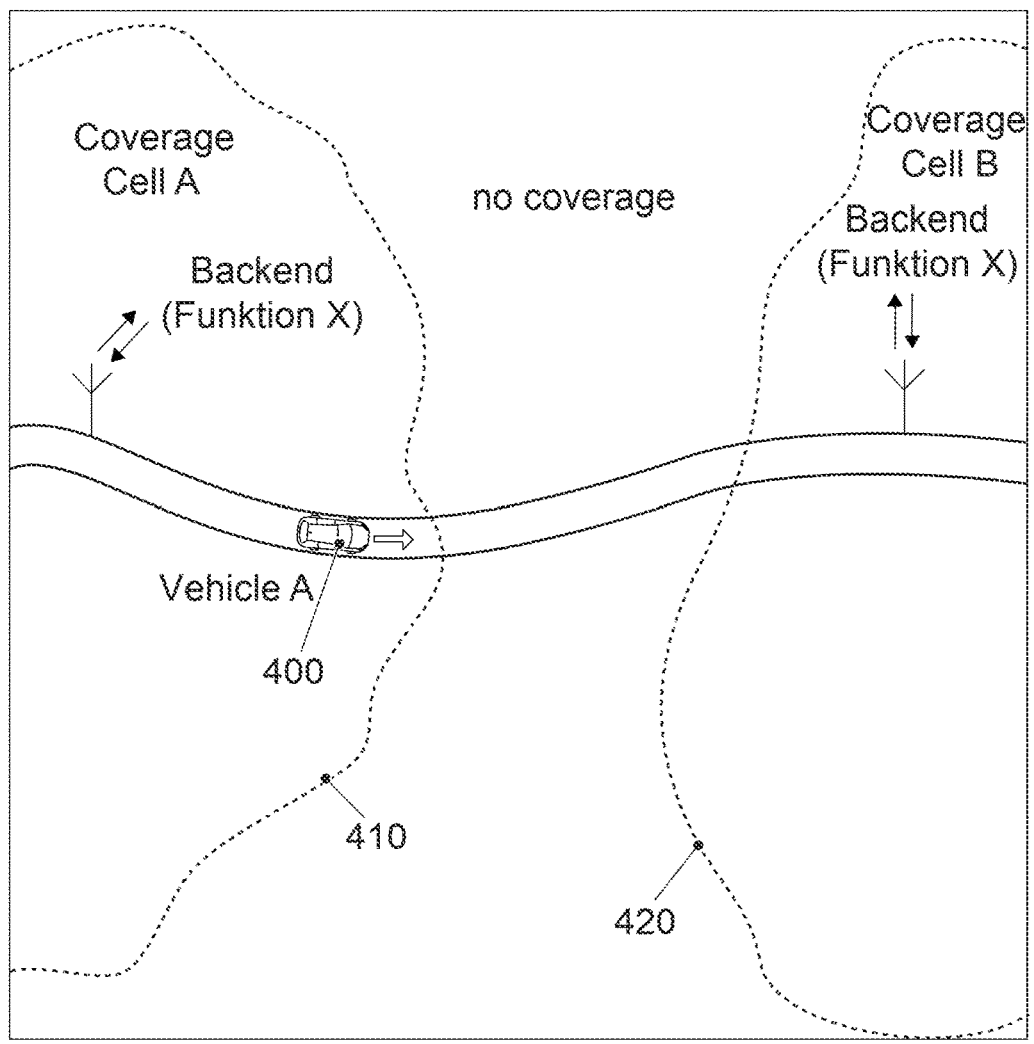
FIGS. 4 and 5 illustrate exemplary embodiments.
Figure 5:
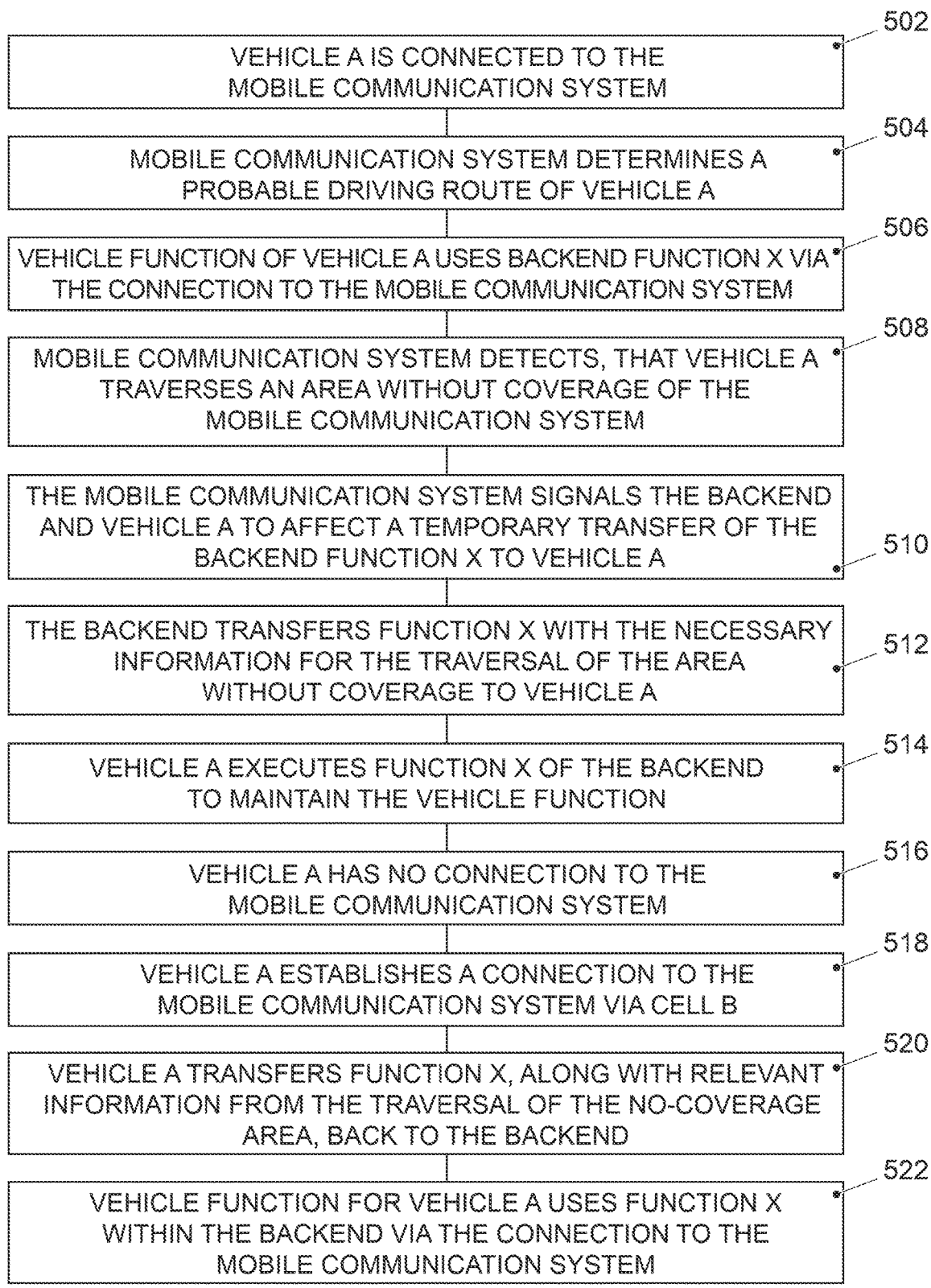

FIGS. 4 and 5 illustrate exemplary embodiments. FIG. 4 shows a schematic diagram of a vehicle A 400 (e.g. vehicle 200) driving between two cells of the mobile communication system 100. Vehicle A 400 is connected to a mobile communication system (e.g. mobile communication system 100) in cell A 410. A communication between the vehicle function and the function X within the backend uses this mobile connection. The mobile communication system may determine or identify a planned route/an estimated route of the vehicle. The mobile communication system may signal the backend and the vehicle A 400 that backend function X has to be temporarily transferred to vehicle A 400. The backend transfers the function X, along with necessary information for maintaining the function X during the passage of the area with insufficient coverage, to vehicle A 400. Vehicle A 400 executes function X. Vehicle A passes through the area with insufficient coverage. Vehicle A 400 establishes a connection to the mobile communication system in cell B 420. Vehicle A 400 transfers function X, along with (all) relevant information collected during the passage of the area with insufficient coverage, back to the backend. The vehicle function of vehicle A 400 (again) uses function X of the backend.

FIG. 5 shows a flow chart of a corresponding method. The method may be implemented similar to the method of FIGS. 1a, 1b, 2a and/or 3a. In FIG. 5 502, the vehicle A (e.g. the vehicle 200/400) is connected to the mobile communication system via cell A of the mobile communication system. In 504, the mobile communication system determines an estimated or probable driving route of the vehicle A 200. In 506, the vehicle function of vehicle A uses function X within the backend (e.g. the backend entity 300) via the connection to the mobile communication system. In 508, the mobile communication system detects, that vehicle A may traverse an area without coverage of the mobile communication system (e.g. the area with insufficient coverage). In 510, the mobile communication system may signal the backend and vehicle A (e.g. by transmitting the information related to the area with insufficient coverage) to affect a temporary transfer of the backend-function X to vehicle A. In 512, the backend may transfer function X with the necessary information for the traversal of the area without coverage to vehicle A. In 514, vehicle A executes the function X of the backend to maintain the vehicle function. In 516, vehicle A has no connection to the mobile communication system. In 518, vehicle A establishes a connection to the mobile communication system via cell B. In 520, vehicle A transfers function X, along with relevant information from the traversal of the area with insufficient coverage (e.g. the intermittent data) back to the backend. In 522, the vehicle function of vehicle A uses function X within the backend via the connection to the mobile communication system.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 Apparatus
12 Interface
14 Control module
20 Apparatus
22 Interface
24 Control module
30 Apparatus
32 Interface
34 Control module
100 Mobile communication system
102 Receiving vehicle data
104 Receiving further vehicle data
110 Controlling an execution of a function for a vehicle
120 Determining an estimated driving route of the vehicle
130 Determining information related to an area with insufficient coverage
140 Transferring the execution of the function from the backend entity to the vehicle
150 Transferring the execution of the function from the vehicle to the backend entity
152 Transferring intermittent data
154 Providing information related to intermittent data
160 Controlling the execution of the function
200 Vehicle
210 Providing vehicle data
220 Transferring the execution of the function from the backend entity to the vehicle
230 Executing the function within the vehicle
240 Transferring the execution of the function from the vehicle to the backend entity
300 Backend entity
310 Receiving vehicle data
320 Executing a function for a vehicle
330 Transferring the execution of the function from the backend entity to the vehicle
340 Transferring the execution of the function from the vehicle to the backend entity
350 Executing a function for a vehicle
400 Vehicle
410 Cell A
420 Cell B
502 Vehicle A is connected to the mobile communication system
504 Mobile communication system determines a probable driving route of vehicle A
506 Vehicle function of vehicle A uses backend function X via the connection to the mobile communication system
508 Mobile communication system detects, that vehicle A traverses an area without coverage of the mobile communication system
510 The mobile communication system signals the backend and vehicle A to affect a temporary transfer of the backend function X to vehicle A
512 The backend transfers function X with the necessary information for the traversal of the area without coverage to vehicle A
514 Vehicle A executes function X of the backend to maintain the vehicle function
516 Vehicle A has no connection to the mobile communication system
518 Vehicle A establishes a connection to the mobile communication system via cell B
520 Vehicle A transfers function X, along with relevant information from the traversal of the area with insufficient coverage back to the backend
522 Vehicle function for vehicle A uses function X within the backend via the connection to the mobile communication system

What is claimed is:

1. A method for transferring an execution of a function for a vehicle between a backend entity and the vehicle, the method comprising:
controlling an execution of the function for the vehicle by a backend entity, wherein the backend entity communicates with the vehicle via a mobile communication system;
determining an estimated driving route of the vehicle;
determining information related to an area with insufficient coverage of the mobile communication system along the estimated route of the vehicle; and
transferring the execution of the function from the backend entity to the vehicle based on the information related to the area with insufficient coverage of the mobile communication system along the estimated route of the vehicle: wherein
the execution of the function includes executing the function.

2. The method according to claim 1, wherein the function is a sensor data processing function for a sensor data of the vehicle.

3. The method according to claim 2, wherein the sensor data comprises at least one of lidar sensor data, radar sensor data, camera sensor data, automatic braking system sensor data, electronic stability control sensor data, light sensor data, temperature sensor data, rain sensor data, and environmental sensor data, wherein the environmental sensor data is suitable for interpreting an environment of the vehicle.

4. The method according to claim 1, wherein the function is an adaptation function for adapting a suspension of the vehicle.

5. The method according to claim 1, wherein the method is performed by a stationary entity of the mobile communication system.

6. The method according to claim 1,
wherein the backend entity is located at a base station of the mobile communication system,
or wherein the backend entity is located in a core network of the mobile communication system,
or wherein the backend entity is a stationary entity located outside the mobile communication system.

7. The method according to claim 1 further comprising:
transferring the execution of the function from the vehicle to the backend entity after the vehicle has left the area with insufficient coverage of the mobile communication system along the estimated route of the vehicle; and
controlling the execution of the function for the vehicle by the backend entity.

8. The method according to claim 7, wherein the transferring of the execution of the function from the vehicle to the backend entity comprises transferring intermittent data of the function from the vehicle to the backend entity via the mobile communication system.

9. The method according to claim 8,
wherein the method further comprises providing information related to the intermittent data of the function to one or more further vehicles,
and/or wherein the transmitted intermittent data is unprocessed data used for executing the function within the vehicle,
or wherein the transmitted intermittent data is processed data resulting from executing the function within the vehicle.

10. The method according to claim 1, further comprising at least one of:
receiving vehicle data from the vehicle, wherein the execution of the function for the vehicle by the backend entity is based on the vehicle data; or
receiving further vehicle data from one or more further vehicles, wherein the execution of the function for the vehicle by the backend entity is based on the further vehicle data.

11. The method of claim 1, wherein
the execution of the function is by the backend entity before the transferring of the execution of the function, and the execution of the function is by the vehicle after the transferring.

12. The method of claim 1, wherein
controlling the execution of the function for the vehicle by the backend entity is such that the execution is by the backend entity, and
transferring the execution of the function from the backend entity to the vehicle is such that the function is subsequently executed within the vehicle.

13. An apparatus for transferring an execution of a function for a vehicle between a backend entity and the vehicle, the apparatus comprising:
at least one interface for communicating with the vehicle and with the backend entity; and
a control module configured to:
control an execution of the function for the vehicle by the backend entity, wherein the backend entity communicates with the vehicle via a mobile communication system,
determine an estimated driving route of the vehicle,
determine information related to an area with insufficient coverage of the mobile communication system along the estimated route of the vehicle, and
transfer the execution of the function from the backend entity to the vehicle via the mobile communication system based on the information related to the area with insufficient coverage of the mobile communication system along the estimated route of the vehicle; wherein
the execution of the function includes executing the function.

14. An apparatus for a vehicle, the apparatus comprising:
an interface for communicating with a backend entity via a mobile communication system; and
a control module configured to:
provide vehicle data of the vehicle to the backend entity via the mobile communication system for use in an execution of a function for the vehicle by the backend entity,
transfer the execution of the function from the backend entity to the vehicle via the mobile communication system based on information related to an area with insufficient coverage of the mobile communication system along an estimated route of the vehicle,
execute the function within the vehicle, and
transfer the execution of the function from the vehicle to the backend entity via the mobile communication system after the vehicle has left the area with insufficient coverage of the mobile communication system along the estimated route of the vehicle; wherein
the execution of the function includes executing the function.

15. The apparatus of claim 14, wherein
the control module is configured such that the execution is by the vehicle after the transferring of the execution of the function from the backend entity to the vehicle.

16. The apparatus of claim 15, wherein
the control module is configured such that, after the transferring of the execution to the backend entity, the execution is by the back end entity.

17. The apparatus of claim 14, wherein
the control module is configured for executing the function after the transfer to the vehicle and before the transfer to the back end entity.

18. An apparatus for a backend entity, the apparatus comprising
at least one interface for communicating via a mobile communication system; and
a control module configured to:
receive vehicle data of a vehicle,
execute a function for the vehicle based on the vehicle data, and
transfer the execution of the function to the vehicle based on information related to an area with insufficient coverage along an estimated driving route of the vehicle; wherein
the execution of the function includes executing the function.

19. The apparatus of claim 18, wherein
the control module is configured for executing the function before transferring the execution of the function to the vehicle and after a transferring of the execution of the function from the vehicle to the back end entity.

* * * * *

UNITED STATES PATENT AND TRADEMARK OFFICE
CERTIFICATE OF CORRECTION

PATENT NO. : 11,383,724 B2
APPLICATION NO. : 16/439807
DATED : July 12, 2022
INVENTOR(S) : Alieiev Roman et al.

It is certified that error appears in the above-identified patent and that said Letters Patent is hereby corrected as shown below:

In the Claims

In Column 22, Line 54 (Claim 1):
-vehicle:-
Should be changed to:
--vehicle;--.

Signed and Sealed this
Eighteenth Day of October, 2022

Katherine Kelly Vidal
*Director of the United States Patent and Trademark Office*